W. H. Greer,
Washing Machine,

N° 52,562. Patented Feb. 13, 1866.

Witnesses:
Theo. Lusch
Wm. Treurii

Inventor:
W H Greer
By Mann Co
atty

UNITED STATES PATENT OFFICE.

W. H. GREER, OF CHICAGO, ILLINOIS.

WASHING-MACHINE.

Specification forming part of Letters Patent No. 52,562, dated February 13, 1866.

*To all whom it may concern:*

Be it known that I, W. H. GREER, of Chicago, in the county of Cook and State of Illinois, have invented new and useful Improvements in Washing-Machines; and I do hereby declare that the following is a full, clear, and exact description thereof, which will enable others skilled in the art to make and use the same, reference being had to the accompanying drawings, forming part of this specification.

The present invention relates more particularly to the rubbing-boards of washing-machines composed of a series of rollers, either arranged radially from a common center or parallel with each other, the object being to prevent the clothes from being wound around and about them as they are in any proper manner rubbed upon them, it consisting in forming the rollers with a series of grooves or corrugations extending around their peripheries, which corrugations mesh into each other and thus accomplish the desired end, as will be perfectly apparent from the following detail description thereof, reference being had to the accompanying plate of drawings, in which—

Figure 1:
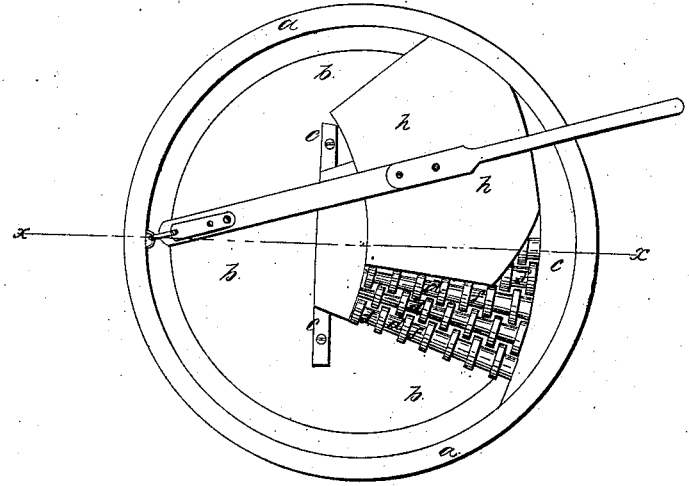
Figure 2:
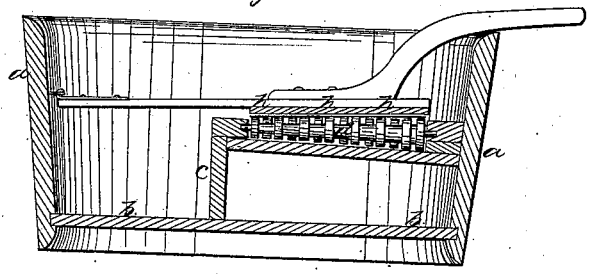
Figure 3:
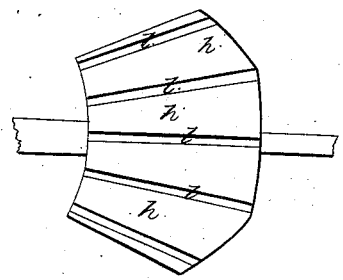

Figure 1 is a plan or top view; Fig. 2, a central vertical section taken in the plane of the line $x$ $x$, Fig. 1; and Fig. 3, a detail view.

$a$ $a$ in the drawings represent a wash-tub made of any of the ordinary forms, styles, and materials, in and to the bottom $b$ of which is secured, by screws or in any other proper manner, two parallel vertical supports, $c$ $c$, one at or near the center and the other at the side of the tub, in which supports, and extending across from one to the other, are arranged a series of similar conical or tapering-shaped rollers, $d$ $d$ $d$, &c., having their peripheries grooved or corrugated in the direction around them, with a series of grooves, $f$ $f$ $f$, which mesh into each other, as plainly seen in Fig. 1, thus preventing, when the clothes are rubbed upon them, all possibility of their being wound around and about them, the advantages of which are manifest.

$h$ $h$ is an additional rubbing-board hung upon the tub so as to be swung freely back and forth over the fixed rubbing-surface or roller-board thereof, by means of which the rubbing of the clothes is greatly facilitated as well as much more easily accomplished. The under surface of this swinging board has a series of grooves, $l$ $l$, in the direction of its length.

I claim as new and desire to secure by Letters Patent—

Constructing the rubbing-board of a washing-machine of a series of conical radial cogged rollers, whose operative faces present a flat surface to the vibrating rubber above, substantially as and for the purpose described.

W. H. GREER.

Witnesses:
   H. B. RUGER,
   JOEL LULL.